J. L. SNYDER.
DEVICE EMPLOYED IN THE MANUFACTURE OF ICE CREAM HORNS OR CONES.
APPLICATION FILED APR. 24, 1919.
1,326,540.  Patented Dec. 30, 1919.
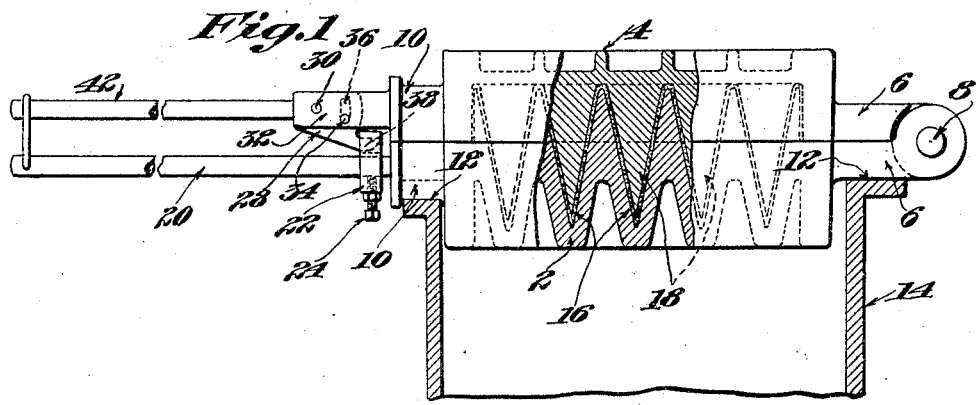
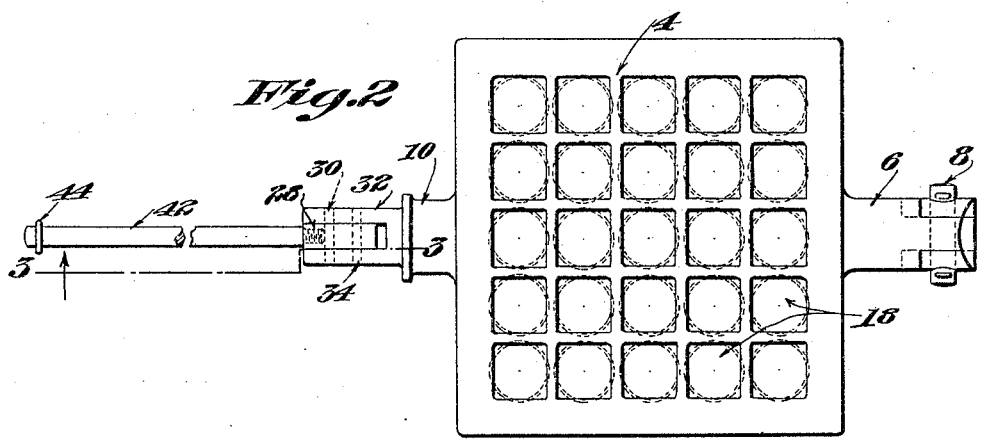
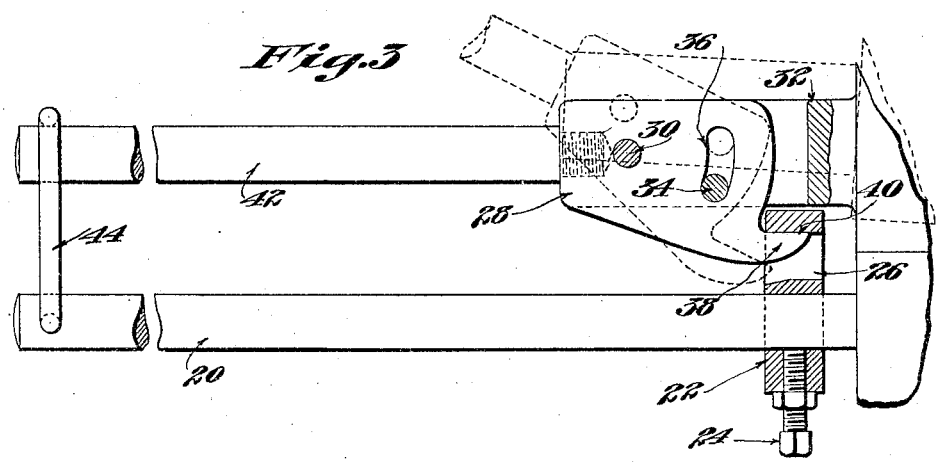
Witness
M. E. Crozier
Inventor
Jacob L. Snyder,
by his attorney
L. B. Weymouth

UNITED STATES PATENT OFFICE.

JACOB L. SNYDER, OF ROXBURY, MASSACHUSETTS, ASSIGNOR TO COLUMBIA ICE CREAM HORN COMPANY, OF ROXBURY, MASSACHUSETTS, A CORPORATION OF MASSACHUSETTS.

DEVICE EMPLOYED IN THE MANUFACTURE OF ICE-CREAM HORNS OR CONES.

1,326,540.     Specification of Letters Patent.     Patented Dec. 30, 1919.

Application filed April 24, 1919. Serial No. 292,289.

*To all whom it may concern:*

Be it known that I, JACOB L. SNYDER, a citizen of the United States, residing at Roxbury, in the county of Suffolk and State of Massachusetts, have invented certain new and useful Improvements in Devices Employed in the Manufacture of Ice-Cream Horns or Cones; and I do hereby declare the following to be a full, clear, and exact description of the invention, such as will enable others skilled in the art to which it appertains to make and use the same.

The present invention relates to heating or cooking devices and more particularly to such devices employed in the manufacture of ice cream horns or cones.

Commercial devices of this type comprise a pair of coöperating heat receiving plates which are pivotally connected at their rear ends and horizontally mounted for rotary movement above a heating device. The heat receiving plates are adapted to be moved relatively toward and from each other about their pivot by means of handles comprising elongated rods projecting from their forward ends. The lower plate is provided with a series of conical recesses and the upper plate is provided with a series of conical protuberances, which enter the recesses when said members are brought together, said protuberances and recesses being of such relative size and shape as to leave a uniform space between them for the reception of the dough or batter from which the cones are to be made. To place the batter in the device, the upper plate is swung upwardly which permits the batter to be poured into the recesses, whereupon the upper plate is swung down upon the other and the plates are clamped together for a sufficient time for the batter to receive the proper amount of heat from the heating device. Heretofore, the plates have been held together solely by means of a metal strap having one end pivoted on the outer end of one of the handles and its other end passed over the outer end of the other handle. Although the heat receiving plates are made of heavy castings, it has been found that with the use of such means for holding the plates together, the expansion of the cooking batter in a comparatively short time warped the plates to such an extent that they become useless for the purposes intended. It is, of course, essential in such devices that the handles are of considerable length in order that the hands of the operator may be placed at a suitable distance from the heating device, and in order that as much leverage as practicable may be obtained to move the heavy plates relatively about their pivots. It is also essential that the device be capable of being manipulated expeditiously in such manner that the plates may be brought together and clamped immediately after the batter is placed in the device.

One object of the present invention is to provide a novel and improved device of the type above described which retains all of the advantages of the prior devices while doing away with the described disadvantage.

The features of the present invention comprise the constructions, arrangements and combinations of parts hereinafter described and claimed, the advantages of which will be obvious to those skilled in the art.

The several features of the present invention will be readily understood from the following description and accompanying drawings in which:—

Figure 1 is a side elevation, partly in section and having parts broken away to save space, of a device embodying the features of the invention in their preferred form; Fig. 2 is a plan view of the device; Fig. 3 is a sectional view, on an enlarged scale, taken on the line 3—3 of Fig. 2.

The device illustrated in the drawings is provided with a pair of heat receiving forms or plates 2 and 4 which are provided with tail pieces 6 pivotally connected by a pivot pin 8, and are further provided with forwardly projecting members 10. The tail pieces 6 and the forwardly projecting members 10, when the plates are brought together, form cylindrical trunnions for supporting the device for rotary movement on bearings 12 formed on the upper end of a frame 14 of a heating device. The lower plate 2 is provided with a series of conical recesses 16 and the upper plate 4 is provided with a series of conical protuberances 18 which enter the recesses when the plates are brought together. The parts above described may be and preferably are the same as the corresponding parts of commercial devices of this type employed in the manufacture of ice cream horns or cones.

The lower plate 2 is provided with a forwardly projecting handle 20 which comprises an elongated rod having its inner end secured to the semi-cylindrical member 10 of the plate. A clamping device is located adjacent the forward ends of the plates, one member of which comprises a block 22 adjustably secured to the rod 20 by means of a set screw 24. The block 22 is provided at its upper end with a horizontal aperture 26. The other member of the clamping device comprises a plate 28 which is pivotally mounted on a pin 30 between the members of a bifurcated lug or bracket 32 projecting from the semi-cylindrical member 10 of the upper plate 4. The movement of the clamping member 28 about its pivot is limited by a stop pin 34 secured to the members of the bifurcated lug 32 and extending through an elongated slot 36 in the clamping member 28, which slot is concentric with the pivot pin 30. The clamping member 28 is provided with a tongue 38 which is adapted to enter the aperture 26 to cause a flattened surface 40 thereon to engage the upper wall of the aperture and thereby clamp the plates 2 and 4 together. The clamping member 28 is provided with a forwardly projecting handle 42 which comprises an elongated rod, which, when the forms or plates are brought together, extends parallel to the handle or rod 20. The outer ends of the rods are adapted to be relatively locked by means of a metal strap 44 having its ends pivoted on the end of the rod 20 so that the other end of the strap may be swung up over the end of the rod 42 as illustrated in the drawings.

To open up the device in order to permit the cones to be removed therefrom, and to place new dough or batter therein, the strap 44 is swung out of engagement with the handle 42 and the handle is swung upwardly to first disengage the members of the clamping device and then to swing the upper or male form upwardly about its pivot. After the new batter is placed in the recesses in the lower form, the upper form is swung down and the handle 42 is further swung downwardly with pressure to cause the tongue 38 of the clamping member 28 to engage the aperture in the clamping member 22 and thereby securely clamp the forms together. The members of the clamping device are retained in rigid engagement by means of the strap 44 which is swung up over the end of the handle 42.

Because of the proximity of the engaging members of the clamping devices to the plates, and the great amount of leverage obtained by means of the handle 42, the forms are rigidly held together in such manner that they effectively resist the tendency of the cooking batter to expand, without danger of the plates becoming warped.

It will be noted that the plates may be brought together and clamped and the device manipulated as expeditiously as is possible with prior devices.

The nature and scope of the present invention having been indicated, and a device embodying the several features of the invention in their preferred form having been specifically described, what is claimed is:—

1. A device of the class described having, in combination, a pair of coöperating heat receiving plates pivoted at one end for the reception of the substance to be conditioned between them, handles projecting from the other end of said plates for relatively moving said plates about their pivot, coöperating clamping members on the handles adjacent said plates which are brought into engagement by relatively moving the handles into the position they assume during the normal conditioning operation of the device, and means for holding the ends of the handles toward each other whereby the clamping members are maintained in engagement to clamp the plates together.

2. A device of the class described having, in combination, a pair of coöperating heat receiving plates pivotally connected at one end for the reception of the substance to be conditioned between them, a pair of handles comprising elongated rods, one of which is secured to one end of one of said plates and the other of which is pivotally connected to the corresponding end of the other of said plates, coöperating clamping members on said rods adjacent said plates for clamping said plates together, and a locking means at the ends of the rods for locking the rods from relative movement to maintain said clamping members in engagement.

3. A device of the class described having, in combination, a pair of coöperating heat receiving plates pivotally connected at one end for the reception of the substance to be conditioned between them, a pair of handles comprising elongated rods projecting from the other end of said plates, a clamping device located adjacent said plates comprising coöperating members on said rods for holding said plates in position when they are brought into engagement, and means located at the other end of said rods for holding said rods in position to lock said clamping members in engagement.

4. A device of the class described having, in combination, a pair of coöperating heat receiving plates pivoted at one end for the reception of the substance to be conditioned between them, a clamping device located adjacent the other end of the plates comprising a member pivotally connected to one of the plates, a member rigidly connected to the other plate for clamping the plates together when the members are brought into engagement, and an elongated handle projecting from the pivoted clamping member for relatively moving the clamping members into engagement.

5. A device of the class described having, in combination, a pair of coöperating heat receiving plates pivoted at one end for the reception of the substance to be conditioned between them, a clamping device located adjacent the other end of the plates comprising a member pivotally connected to one of the plates and a member connected to the other of the plates for clamping the plates together when the members are relatively moved into engagement, and a handle projecting from the pivoted clamping member for first swinging this member out of engagement with the other clamping member, and then relatively moving the plates about their pivot away from each other.

6. A device of the class described having, in combination, a pair of coöperating heat receiving plates pivoted at one end for the reception of the substance to be conditioned between them, a clamping device located adjacent the other end of the plates comprising two members, one of which is pivotally connected to one of the plates and the other of which is connected to the other plate and is provided with an aperture, a tongue formed on the pivoted clamping member for engaging the aperture in the other clamping member to clamp the plates together, a handle projecting from the pivoted clamping member for relatively moving the clamping plates into and out of engagement, and means for locking the handle in position when the clamping plates have become engaged.

7. A device of the class described having, in combination, a pair of coöperating heat receiving plates pivoted at their rear ends for the reception of the substance to be conditioned between them, handles projecting from the forward ends of the plates comprising elongated rods, one of which is rigidly connected to one of the plates and the other of which is pivotally connected to the other plate, a clamping device located adjacent the forward ends of the plates comprising coöperating members, one of which is movable with said pivotally connected rod and the other of which is secured to the other rod, and means located at the outer ends of the rods for locking the handles from relative movement whereby the members of the clamping device are held in engagement.

JACOB L. SNYDER.